United States Patent
Goel (10) Patent No.: US 11,949,773 B2
(45) Date of Patent: Apr. 2, 2024

(54) SYSTEMS AND METHODS FOR SECURE KEY MANAGEMENT USING DISTRIBUTED LEDGER TECHNOLOGY

(71) Applicant: Collibra Belgium BV, Brussels (BE)

(72) Inventor: Satyender Goel, Chicago, IL (US)

(73) Assignee: Collibra Belgium BV, Brussels (BE)

( * ) Notice: Subject to any disclaimer, the term of this patent is extended or adjusted under 35 U.S.C. 154(b) by 101 days.

(21) Appl. No.: 17/215,567

(22) Filed: Mar. 29, 2021

(65) Prior Publication Data

US 2022/0311597 A1    Sep. 29, 2022

(51) Int. Cl.
| | |
|---|---|
| H04L 9/06 | (2006.01) |
| H04L 9/08 | (2006.01) |
| H04L 9/14 | (2006.01) |
| H04L 9/32 | (2006.01) |
| H04L 9/00 | (2022.01) |

(52) U.S. Cl.
CPC .......... *H04L 9/0631* (2013.01); *H04L 9/0891* (2013.01); *H04L 9/14* (2013.01); *H04L 9/3213* (2013.01); *H04L 9/50* (2022.05)

(58) Field of Classification Search
CPC ..... H04L 9/0891; H04L 9/3213; H04L 9/088; H04L 9/14; H04L 9/0631; H04L 9/50; G06F 21/6209
See application file for complete search history.

(56) References Cited

U.S. PATENT DOCUMENTS

| | | | | |
|---|---|---|---|---|
| 9,697,371 | B1 * | 7/2017 | Willden | H04L 63/08 |
| 10,833,846 | B1 * | 11/2020 | Zhuo | G06F 21/64 |
| 11,233,655 | B2 * | 1/2022 | Yang | H04L 9/3239 |
| 11,315,110 | B2 * | 4/2022 | Jayachandran | H04L 9/0618 |
| 2019/0065764 | A1 * | 2/2019 | Wood | H04L 9/0637 |
| 2020/0036533 | A1 * | 1/2020 | Soundararajan | H04W 12/104 |
| 2020/0177579 | A1 * | 6/2020 | Allen | H04L 63/123 |
| 2020/0204876 | A1 * | 6/2020 | Thompson | H04N 21/2541 |
| 2020/0387623 | A1 * | 12/2020 | Bayon | H04L 9/3242 |

(Continued)

FOREIGN PATENT DOCUMENTS

CN          111914269 A      11/2020

OTHER PUBLICATIONS

PCT/EP2022/057751, International Search Report and Written Opinion dated Jul. 22, 2022, 13 pgs.

*Primary Examiner* — Mohammad A Siddiqi (74) *Attorney, Agent, or Firm* — Perkins Coie LLP (57) ABSTRACT

The present disclosure is directed to systems and methods for securely managing and administering an encryption/decryption key using distributed ledger technology (DLT). In some examples, a client may possess a data attribute (or a dataset of data attributes). The client may receive tokenization parameters to apply to the data attribute to encrypt the data attribute. After tokenizing the data attribute, the client may then request the creation of an encryption key to be applied to the token. A third-party key management system (KMS) may create an encryption key and a salt. The salt may be applied to the token, and the salted token may then be encrypted. Additionally, a decryption key may be created and stored securely at the third-party KMS. The client may transmit the encrypted token to a third-party consolidation platform, wherein the consolidation platform requests access to the decryption key to unveil the underlying token.

16 Claims, 8 Drawing Sheets

(56) References Cited

U.S. PATENT DOCUMENTS

| | | | |
|---|---|---|---|
| 2021/0099573 A1* | 4/2021 | van Rensburg | H04M 3/436 |
| 2021/0157938 A1* | 5/2021 | Chen | H04L 9/088 |
| 2021/0224418 A1* | 7/2021 | Nakajima | G06F 21/6245 |
| 2021/0273785 A1* | 9/2021 | Higashikado | H04L 9/0819 |
| 2021/0279365 A1* | 9/2021 | Apsingekar | H04W 12/02 |
| 2021/0377002 A1* | 12/2021 | Guillama | G06F 16/9024 |
| 2022/0078170 A1* | 3/2022 | Kravitz | G06F 21/64 |
| 2022/0311597 A1* | 9/2022 | Goel | H04L 9/0891 |
| 2023/0114924 A1* | 4/2023 | Breu | H04L 9/30 726/4 |

* cited by examiner

SYSTEMS AND METHODS FOR SECURE KEY MANAGEMENT USING DISTRIBUTED LEDGER TECHNOLOGY

CROSS-REFERENCE TO RELATED APPLICATION(S)

U.S. patent application Ser. No. 17/103,751, entitled "SYSTEMS AND METHODS FOR UNIVERSAL REFERENCE SOURCE CREATION AND ACCURATE SECURE MATCHING"; patent application Ser. No. 16/844,927, titled "CONTEXT DRIVEN DATA PROFILING"; and patent application Ser. No. 16/776,293 titled "SYSTEMS AND METHOD OF CONTEXTUAL DATA MASKING FOR PRIVATE AND SECURE DATA LINKAGE" are hereby incorporated by reference in their entirety.

TECHNICAL FIELD

The present disclosure relates to a distributed key management system and use of distributed ledger technology (DLT).

SUMMARY

Encryption schemes are used to safeguard data assets of an owner/source while sharing certain data assets with parties/vendors in order to procure services from said parties/vendors. As such, an inherent vulnerability exists for external hacking or misuse by bad actors who may have access to the encrypted data assets. Data owners, however, want to obtain the benefit of third-party services without compromising the underlying data access (e.g., exposing the raw data). To address this issue, the present application presents a distributed mechanism for creating, hosting, and managing encryption and decryption keys, where no two parties can access each key (or secret) to unlock the data. Such a structure of separating the keys at run-time, allows for the creation of secure and trusted data exchange in a third-party environment. Further, the utilization of blockchain in storing the keys and access logs provides immutability to avoid any wrongdoings by a third-party management platform. Utilizing DLT keep the distribution of keys among the key management platform honest and accountable in terms of granting access to certain keys to certain stakeholders.

Another consideration includes processing data. To make better use of the data to obtain maximum value of the services offered by a third-party vendor, the underlying data needs to be processed. Yet, providing blanket permissions via service contracts on certain applications creates potential vulnerabilities on sensitive data assets within an organization. Further, as organizations grow and operate, previously allowed use of certain data assets may become impermissible. To address this issue, the present application utilizes smart contracts (one of the facets of DLT) to create run-time approval vehicles for granting or revoking access to certain data assets.

BACKGROUND

To receive and decrypt encrypted data from a sender using asymmetric or symmetric encryption (e.g., RSA algorithms), a sender usually requires access to the receiver's key prior to encryption so that when the receiver receives the encrypted data, the receiver can use the key (private key in case of asymmetric encryption) to decrypt the data. In order to provision a receiver's encryption key, a sender (or an intermediary) typically must request the encryption key from the receiver and wait for the receiver to deliver the key. The process of manually requesting the encryption key is cumbersome and time-consuming. Further, waiting for the receiver to send and/or grant access to the encryption key causes unnecessary delay in the communication process between a sender and a receiver. As such, there is a need to more efficiently transmit public keys between entities while maintaining a high level of security.

As background, public-key cryptography (or asymmetric cryptography) is a cryptographic system that uses pairs of keys: public keys, which may be disseminated widely, and private keys, which are known only to the owner of the private keys. In an asymmetric cryptographic system, an entity can encrypt a message using a receiver's public key, but that encrypted message can only be decrypted by with the receiver's private key.

Transport Layer Security (TLS) is one Internet standard that relies upon public-key cryptography for communications over a computer network. Before a client and server can begin to exchange information protected by TLS, the client and server must securely exchange or agree upon an encryption key and a cipher to use when encrypting data. One such example of an encryption algorithm is Advanced Encryption Standard (AES), which is a subset of a block cipher.

Related to symmetric cryptography is "salt," which is random data that is used as an additional input to a one-way function that hashes data, a password, passphrase, key, token, etc. Salts are used to safeguard passwords in storage. A new salt can be randomly generated for each password. In a typical setting, the salt and the password (or its version after key stretching) are concatenated and processed with a cryptographic hash function, and the output hash value (but not the original password) is stored with the salt in a database. This allows for later authentication without keeping and therefore risking exposure of plaintext password in the event that the authentication data store is compromised. On such hashing algorithm that can be used is SHA-2 (Secure Hash Algorithm 2), which is a set of cryptographic hash functions Another facet of the present application is blockchain-based technology. A blockchain is a continuously growing list of records, called blocks, which are linked and secured using cryptography. Each block may contain a hash pointer as a link to a previous block, a timestamp, and transactional data (e.g., each block may include many transactions). By design, a blockchain is inherently resistant to modification of the transactional data. A blockchain may be managed by a peer-to-peer network of nodes (e.g., devices) collectively adhering to a consensus protocol for validating new blocks. Once recorded, the transaction data in a given block cannot be altered retroactively without the alteration of all previous blocks, which requires collusion of a majority of the network nodes. Generally, a blockchain is one type of "distributed ledger." Distributed ledgers use independent computers (e.g., nodes) to record, share, and synchronize transactions in their respective electronic ledgers (instead of keeping data centralized as in a traditional ledger).

A blockchain is an append-only data structure maintained by a network of nodes that do not fully trust each other. A permissioned blockchain is a type of blockchain where access to the network of nodes is controlled in some manner, e.g., by a central authority and/or other nodes of the network. All nodes in a blockchain network agree on an ordered set of blocks, and each block may contain one or more transactions. Thus, a blockchain may be viewed as a log of ordered transactions. One particular type of blockchain (e.g., Bitcoin) stores coins as system states shared by all nodes of the network. Bitcoin-based nodes implement a simple replicated state machine model that moves coins from one node address to another node address, where each node may include many addresses. Furthermore, public blockchains may include full nodes, where a full node may include an entire transactional history (e.g., a log of transactions), and a node may not include the entire transactional history. For example, Bitcoin includes thousands of full nodes in all of the nodes that are connected to Bitcoin.

With the advent of decentralized blockchains came decentralized finance, or "DeFi." DeFi is an umbrella term for centralized permissionless financial infrastructure, wherein a variety of cryptocurrency-based financial applications operate. What makes these applications decentralized is that they are not managed by a central institution, but instead, the rules of these applications are written in code, and the code is open to the public for anyone to audit. These rules written in code are known as "smart contracts," which are programs running on a blockchain that execute automatically when certain conditions are met. DeFi applications are built using smart contracts. DeFi applications can be viewed as a cluster of second layer applications running on top of a blockchain.

Presently, accessing and sharing data between entities requires manual requests to each entity, and the sharing of data is often lacking in security (e.g., using symmetric cryptography like a simple password) or intermediaries (e.g., directly transmitting data over an unsecured channel to a requestor). As such, there is a need to more efficiently and more securely share data among entities.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to systems and methods for administering keys (or "secrets") using distributed ledger technology (DLT). Specifically, in an example environment, a client (who wishes to share data) may interface with a third-party consolidation platform (i.e., an intermediary). The third-party consolidation platform may provide a remote software/application to the client, which requires configuration parameters, client specific user authentication and salt hash, etc. The client-side application may then apply an encryption to a hashed (salted by a third-party secret) client data, which functions similarly to a private key in a public-private-key infrastructure. In examples, the client may obtain the secret key(s) from a different third-party platform that is providing a DLT key management system (KMS). By utilizing the DLT KMS, a client is able to receive authentication keys for further encrypting its data. The third-party KMS provider also holds the key/secret for the client and may share that key with the third-party consolidation platform upon instruction from the client. Once the encryption key/secrets are generated by client, then the third-party KMS provider may transmit the encrypted key/secrets to a distributed ledger (e.g., blockchain). The encrypted key may be stored on the distributed ledger for future access by the remote application pending permission by the client (owner of the access key). The remote application may also use the client's and third party secrets/keys to tokenize and encrypt at least one attribute (e.g., data attribute, such as Name, Address, Phone Number, Social Security Number, Business Entity, Product Identifier, etc.) to create an "encrypted token." This encrypted token/data may be transmitted to the third-party consolidation platform. To access the underlying token/data represented by the token, the token needs to be decrypted by using the client's key as inputs (i.e., dual-layer encryption of the data attribute).

When a requestor desires to access the client's secret/key, the client must first indicate permission to a requestor. Such granting of permission may be recorded as a block on the blockchain. Once permission is granted, the third-party consolidation platform may then access the client's secret/key on the blockchain and apply the decryption algorithm (e.g., encrypted token/data decryption), so the client's secret/key may be used by the requestor to then access the underlying token/data attribute. The requestor may then access the identifying toke/data by using the decryption key as an input. In other words, for a requestor to access the underlying identifying token/data that is stored on the third-party consolidation platform, the secret/key is used to decrypt the token. Once the token/data is decrypted and accessed by the requestor for use cases like, compared against token/data that the requestor has in its possession for trusted source data matching purposes. For example, a requestor may use the underlying token/data to enable completion of certain data attribute associated with a certain data entity that the client previously did not have in its possession (e.g., a phone number).

In this example, it is important to note that the third-party consolidation platform does not have access to the underlying data as part of the encrypted or decrypted token. Only the client has access to the underlying data.

Figure 1:
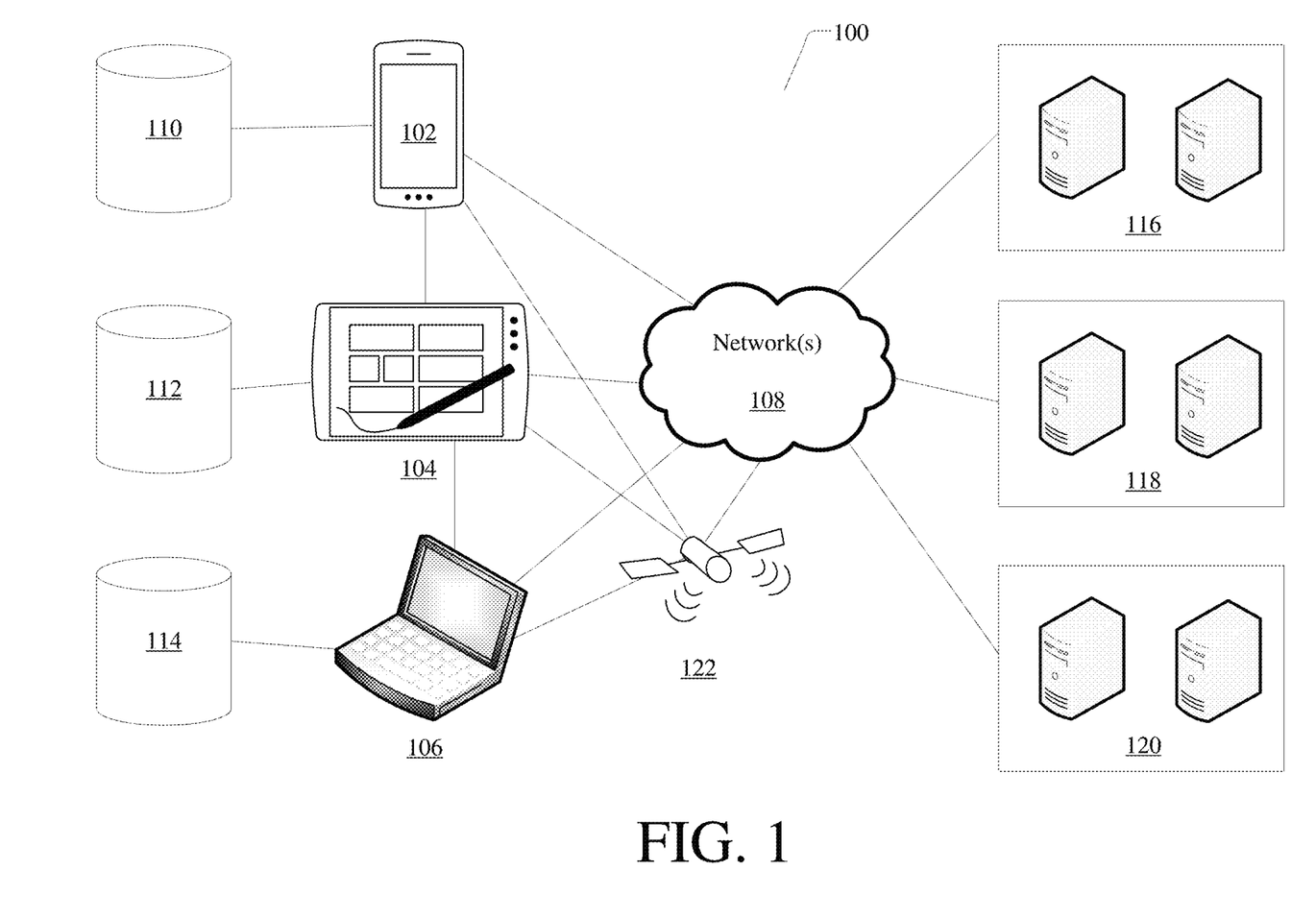
FIG. 1 illustrates an example of a distributed system for administering an access key using a distributed ledger.

FIG. 1 illustrates an example of a distributed system for administering the secret/key using a distributed ledger. Example system 100 presented is a combination of interdependent components that interact to form an integrated whole for automatically transferring an asset based on a smart contract. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120. In some examples, the client devices and/or server devices may be a distributed ledger node. In other examples, each client device and/or server device in the network may be considered a distributed ledger node if it has a copy of the distributed ledger and is running a distributed ledger software application.

Client devices 102, 104, and/or 106 may be configured to receive and transmit secrets/keys, encryption algorithms, and tokens. They may also be configured to communicate within a blockchain network, as well as host a copy of a blockchain locally in local databases 110, 112, and/or 114. On top of the blockchain may reside a DeFi application that the client devices 102, 104, and/or 106 are configured to run. In one example, a client device 102 may be a mobile phone, client device 104 may be a tablet, and client device 106 may be a laptop/personal computer.

In some example aspects, client devices 102, 104, and/or 106 may be configured to communicate with a satellite, such as satellite 122. Satellite 122 may be a satellite (or multiple satellites) within a cellular system. Client devices 102, 104, and/or 106 may receive data via cellular protocols from satellite 122. The cellular data received by client devices 102, 104, and/or 106 may be stored local databases 110, 112, and/or 114. Additionally, such cellular data may be stored remotely at remote servers 116, 118, and/or 120. In other examples, client devices 102, 104, and/or 106 may be configured to communicate with one another via near-range communication protocols, such as Bluetooth.

Client devices 102, 104, and/or 106 may also be configured to run software that implements a blockchain with at least one DeFi application for receiving secrets/keys (encrypted) and read requests to access the secrets/keys, as well as transaction history between a client-owner of a secret/key and a requestor. Furthermore, client devices 102, 104, and/or 106 may be configured to run software provided by a third-party consolidation platform that allows a secret/key to be encrypted (e.g., using a salt).

For example, during initial setup, the client may grant access to the third-party consolidation platform to receive data via client device(s) 102, 104, and/or 106. The system may then begin receiving encrypted data from the client in the form of encrypted tokens (i.e., data attribute+salt+secret/key). The tokens may be transmitted from a client to a third-party consolidation platform, where the tokens may be stored remotely on server(s) 116, 118, and/or 120. In other instances, copies of the tokens may be stored locally at databases 110, 112, and/or 114. In some examples, an encrypted key (e.g., public key+salt) may be stored as a block on the blockchain. The secret/key may be transmitted from a client device over network(s) 108 or satellite 122.

In other examples, the salt hash (i.e., global salt), token encryption key, and object ID encryption key may be stored on a private blockchain, hosted by a distributed ledger host server, such as server(s) 116, 118, and/or 120.

A smart contract (e.g., SLA between service provider and consumer) may also reside on the blockchain network. The smart contract may be a smart contract executed between a client and requestor, client and third-party consolidation platform, requestor and third-party consolidation platform, and/or a combination of the aforementioned. Copies of the smart contract may be stored locally at local databases 110, 112, and/or 114, as well as remotely at servers 116, 118, and/or 120. The smart contract may determine which entities have access to a client's secrets/keys. For example, the smart contract may be established to allow a certain requestor to access a client's secret/key to then access particular identifying token/data that are encrypted within an encrypted token/token previously transmitted to the third-party consolidation platform by the client. The smart contract may contain provisions of which entities have access to a client's key and for how long and for which token/data the key may be used to access. Further, the smart contract may indicate when certain access is revoked.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to query a blockchain to transmit an access key and/or grant or revoke permission to an access key. A graphical user interface may display on the mobile device 102 to allow a user to execute actions on the blockchain.

In other example aspects, devices 116, 118, and/or 120 may be databases that are utilized to store encrypted tokens in the system. As previously described, encrypted tokens are encrypted and hashed data attributes using a key and salt for dual-layer encryption. The data attributes may comprise any viable data attribute regarding persons, businesses, products, locations, etc. The data attributes may comprise personally identifiable information (PII) for an individual or, in other examples, certain product identification information for a particular product in a supply chain. For instance, one database may store tokens associated with certain domains (e.g., persons) and another database may store tokens associated with other domains (e.g., businesses). Contextual indicators may be utilized to store and organize the tokens received by the third-party consolidation platform. For instance, subdomains may be applied to the tokens. A subdomain may be an industry (e.g., automotive) within a broader domain (e.g., businesses), for example.

Figure 2:
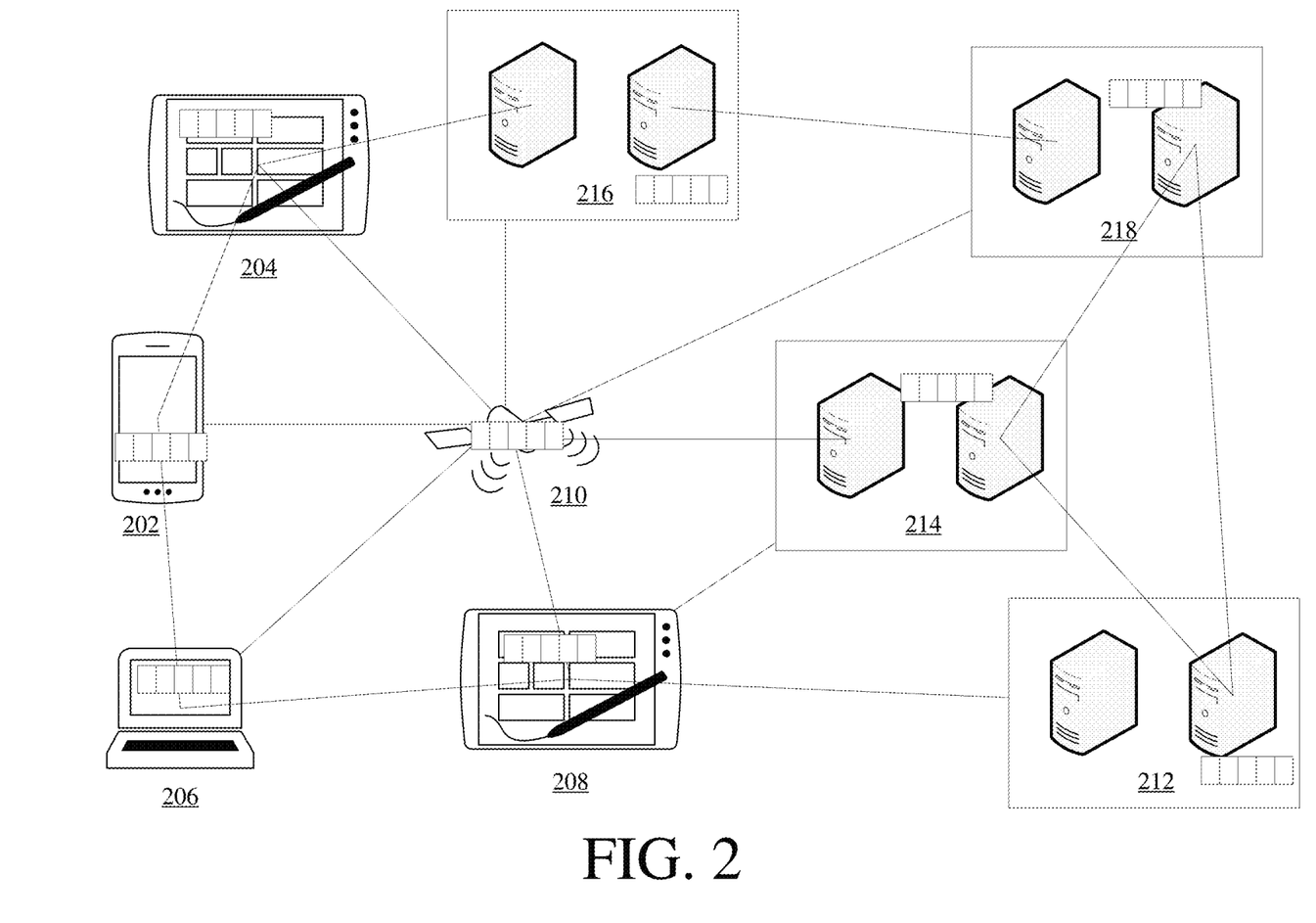
FIG. 2 illustrates an example distributed blockchain architecture for administering an access key.

FIG. 2 illustrates an example distributed blockchain architecture for administering the secret/key. FIG. 2 is an alternative illustration of a distributed system like FIG. 1. In FIG. 2, each of the network devices are interconnected and communicate with one another. Each device in the network has a copy of the blockchain, as the blockchain is not controlled by any single entity but rather a distributed system, in some examples. In other examples, the blockchain may be a permissioned blockchain that includes an access-control layer, preventing and allowing some devices to read and write certain information to the blockchain.

Specifically, in FIG. 2, mobile device 202, tablets 204 and 208, laptop 206, satellite 210, and server nodes 212-218 are all connected and communicating with one each other in the blockchain network. Each node may store a local copy of the blockchain, or at least a portion of the blockchain. For example, laptop 206 may query the blockchain in the blockchain network, and server 214 may receive the query and produce a block from the copy of the blockchain that is stored on server 214. Laptop 206 may receive the information located within the block (e.g., secret/key, grants of permissions, revocations, etc.). In short, the systems and methods described herein may be implemented within a distributed architecture as displayed in FIG. 2, and in some examples, implemented on a single node within the distributed blockchain network.

Figure 3:
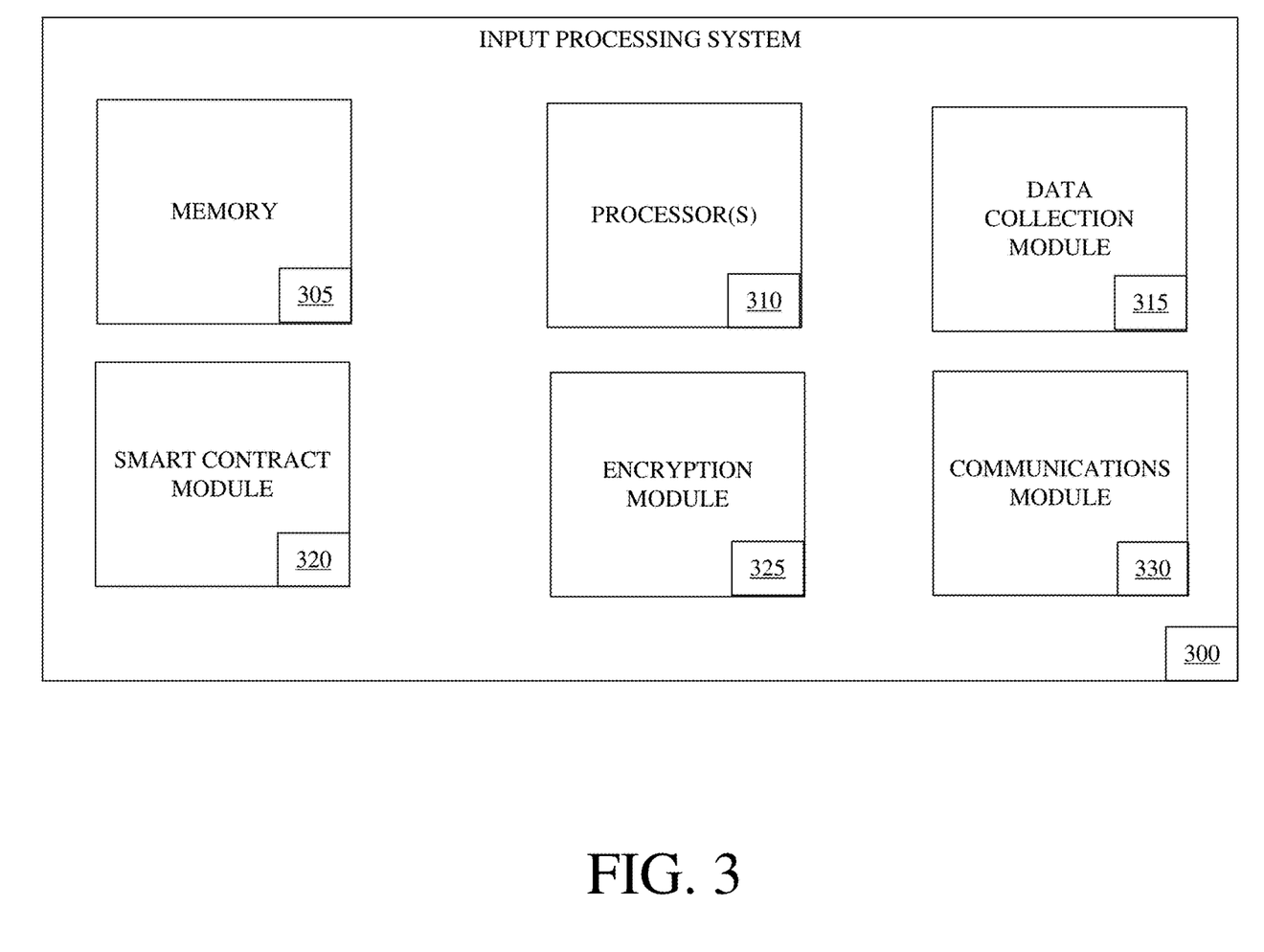
FIG. 3 illustrates an example input processing system for implementing systems and methods for administering an access key using a distributed ledger.

FIG. 3 illustrates an example input processing system for implementing systems and methods for administering an access key using a distributed ledger. The input processing system (e.g., one or more data processors) is capable of executing algorithms, software routines, and/or instructions based on processing data provided by a variety of sources related to administering secrets/keys and encryption algorithms. The input processing system can be a general-purpose computer or a dedicated, special-purpose computer. According to the embodiments shown in FIG. 3, the disclosed system can include memory 305, one or more processors 310, data collection module 315, smart contract module 320, encryption module 325, and communications module 330. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 305 can store instructions for running one or more applications or modules on processor(s) 310. For example, memory 305 could be used in one or more embodiments to house all or some of the instructions needed to execute the functionality of data collection module 315, smart contract module 320, encryption module 325, and communications module 330. Generally, memory 305 can include any device, mechanism, or populated data structure used for storing information, including a local copy of a blockchain data structure. In accordance with some embodiments of the present disclosures, memory 305 can encompass, but is not limited to, any type of volatile memory, nonvolatile memory, and dynamic memory. For example, memory 305 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 305. In some example aspects, memory 305 may store at least one database containing tokens, token encryption keys, object identifier encryption keys, and other encryption keys, etc. In other examples aspects, memory 305 may store at least one copy of a blockchain with at least one DeFi application running on the blockchain. In yet other example aspects, memory 305 may store assets (e.g., access keys) that may be submitted to a blockchain via a DeFi application. Any of the data, programs, and databases that may be stored in memory 305 may be applied to data collected by data collection module 315.

Data collection module 315 may be configured to collect data associated with secrets/keys and tokens. For instance, data collection module 315 may be configured to receive secrets/keys from a client and transmit the secrets/keys to smart contract module 320 for writing to a blockchain. In other instances, data collection module 315 may receive encrypted tokens/tokens from a client, which may be comprised of an encrypted token/data attribute.

Alternately, data collection module 315 may interrogate, or otherwise solicit data from, one or more data sources comprising such information (e.g., client devices, distributed ledger, requestor, third-party consolidation platform, etc.). For example, data collection module 315 may have access to a client configuration, encryption and/or decryption keys, or the like. Data collection module 315 may use a set of APIs or similar interfaces to communicate requests to, and receive response data from, such data sources. In at least one example, the data collection process of data collection module 315 may be triggered according to a preset schedule, in response to a specific user request to collect data (e.g., certain data attributes are hashed and encrypted and transmitted as encrypted tokens to the third-party consolidation platform), or in response to the satisfaction of one or more criteria (e.g., requestor has been granted access to a client's key, so client now transmits encrypted token to third-party consolidation platform to be decrypted by requestor). Data collection module 315 may also be configured to receive data associated with the terms of smart contracts negotiated and executed among the client, requestor, and third-party consolidation platform.

Smart contract module 320 may be configured to receive data from data collection module 315. The data received by smart contract module 320 may allow the smart contract module 320 to construct at least one smart contract on the blockchain. For instance, if access is granted from a client to a requestor, a smart contract may be configured that specifies allowing the requestor access to a client's key as long as access is granted. Smart contract module 320 may also be configured to receive a secret/key (i.e., encrypted key) and store it on the blockchain for access by a requestor that has permission to access the key. Further, requests from the requestor (e.g., read requests to access the key) may be stored on the blockchain via smart contract module 320.

In other example aspects, smart contract module 320 may be configured to receive data associated with a smart contract between a client, a third-party KMS platform, and a third-party consolidation platform. For instance, a smart contract may specify that the third-party consolidation platform may receive a decryption key belonging to the client from the third-party KMS platform (that is storing the client's decryption key). This decryption key may allow the third-party consolidation platform to decrypt the token in order to perform processing, e.g., trusted source data matching.

Encryption module 325 may be configured to apply an encryption algorithm to a piece of data. For example, encryption module 325 may be configured to apply a salt during hashing of the data to create a "token." In another example, encryption module 325 may be configured to apply an encryption algorithm to a data attribute (e.g., salt+key+data attribute) to create an encrypted token. Encryption module 325 may also be configured to store and control access to decryption keys, such as token decryption keys and object identifier (ID) decryption keys. Other hashing and encryption methods may be used by encryption module 325, including but not limited to, SHA2 348, SHA3, TripleDES, Twofish encryption algorithms, Blowfish encryption algorithms, Advanced Encryption Standard (AEs), IDEA encryption algorithm, MD5 encryption algorithms, and/or RSA security encryption algorithms.

Communications module 330 is associated with sending/receiving information (e.g., collected by data collection module 315, smart contract module 320, and encryption module 325) with a remote server or with one or more client devices. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 330 sends information collected by data collection module 315 and processed by smart contract module 320 and encryption module 325. Furthermore, communications module 330 may be configured to communicate certain terms of a smart contract from smart contract module 320 and encrypt or decrypt certain data via encryption module 325 to a client device. Additionally, communications module 330 may be configured to communicate an updated status message of permission granted or permission denied after, e.g., an access key is either permitted or revoked between a client and a requestor.

Figure 4:
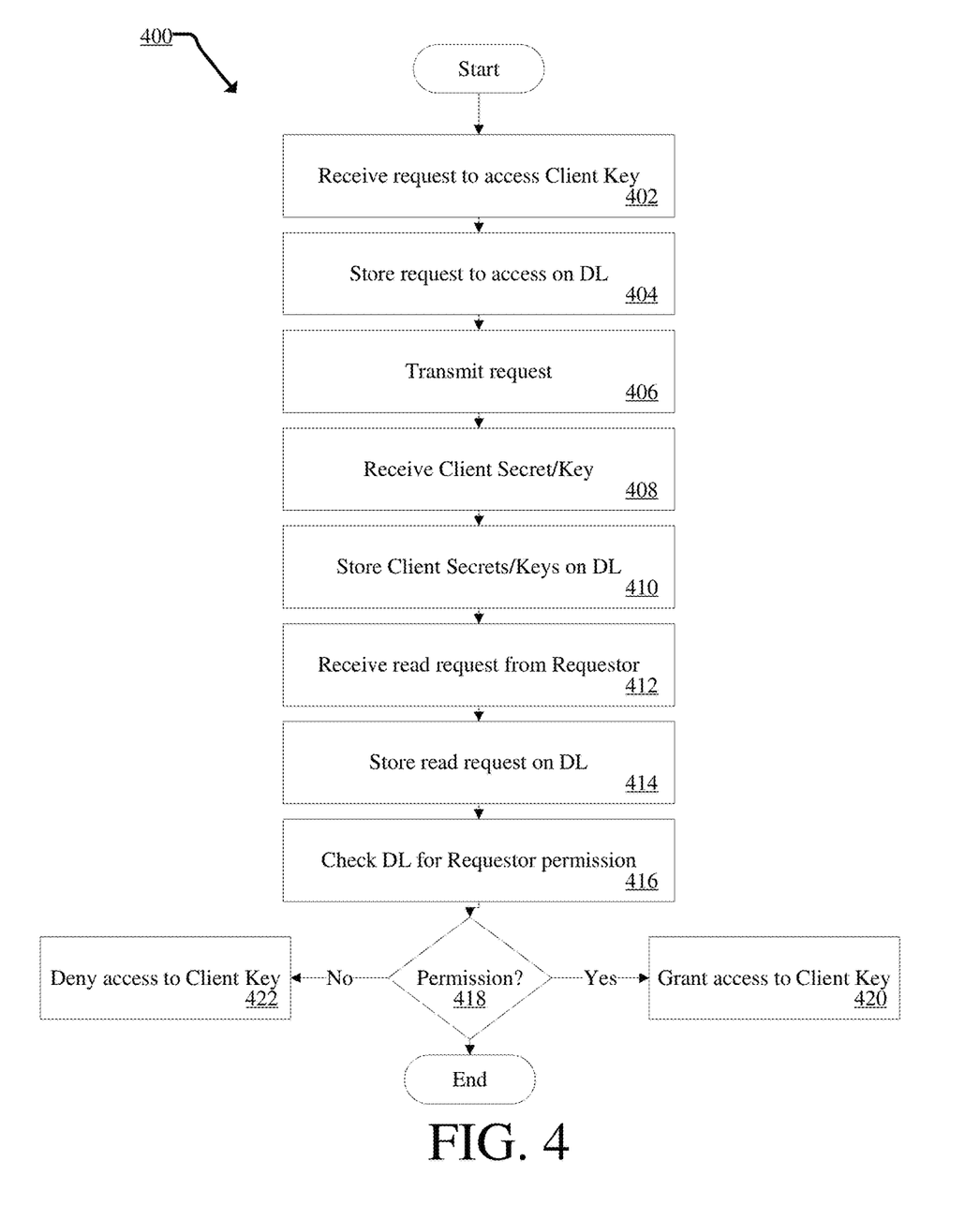
FIG. 4 illustrates an example method for administering an access key using a distributed ledger from the perspective of a third-party consolidation platform.

FIG. 4 illustrates an example method for administering a secret/key using a distributed ledger from the perspective of a third-party consolidation platform. Method 400 is from the perspective of a third-party consolidation platform. The third-party consolidation platform, for example, may serve as an intermediary between a client (owner of a secret/key) and a requestor. Method 400 begins with receiving a request to access a client key from a requestor at 402. The request is then stored on a distributed ledger (e.g., blockchain) at 404. The request may then be transmitted to the client at 406, where the client may determine whether to grant or deny the request. If the client accepts the request, then the client may transmit an access key to be stored on the distributed ledger. In another example, step 406 may be a transmission request to a third-party KMS provider that is hosting client's secret/key. Based on a previously-established smart contract, for example, the third-party KMS provider may provide the client key to the third party consolidation platform if the client had previously granted the third-party consolidation platform permission to receive the secret/key. In such an architecture, the client may not possess the secret/key, since the third-party KMS system is hosting and managing the client's secret/key.

The third-party consolidation platform may receive the client secret/key at 408 and store the client secret/key on the distributed ledger at 410. At this point, a requestor may request to access the secret/key via a read function. However, if the requestor does not have permission to access the secret/key on the distributed ledger, then the requestor will be denied access to that secret/key.

A read request from a requestor may be received at 412. The read request may be stored on the distributed ledger at 414. The third-party consolidation platform may check the record on the distributed ledger to determine if the requestor has permission to access the client's secret/key at 416. At decision diamond 418, if permission exists, then the requestor is granted access to the client's key at 420. If permission does not exist, then access to the client's key is denied.

Figure 5:
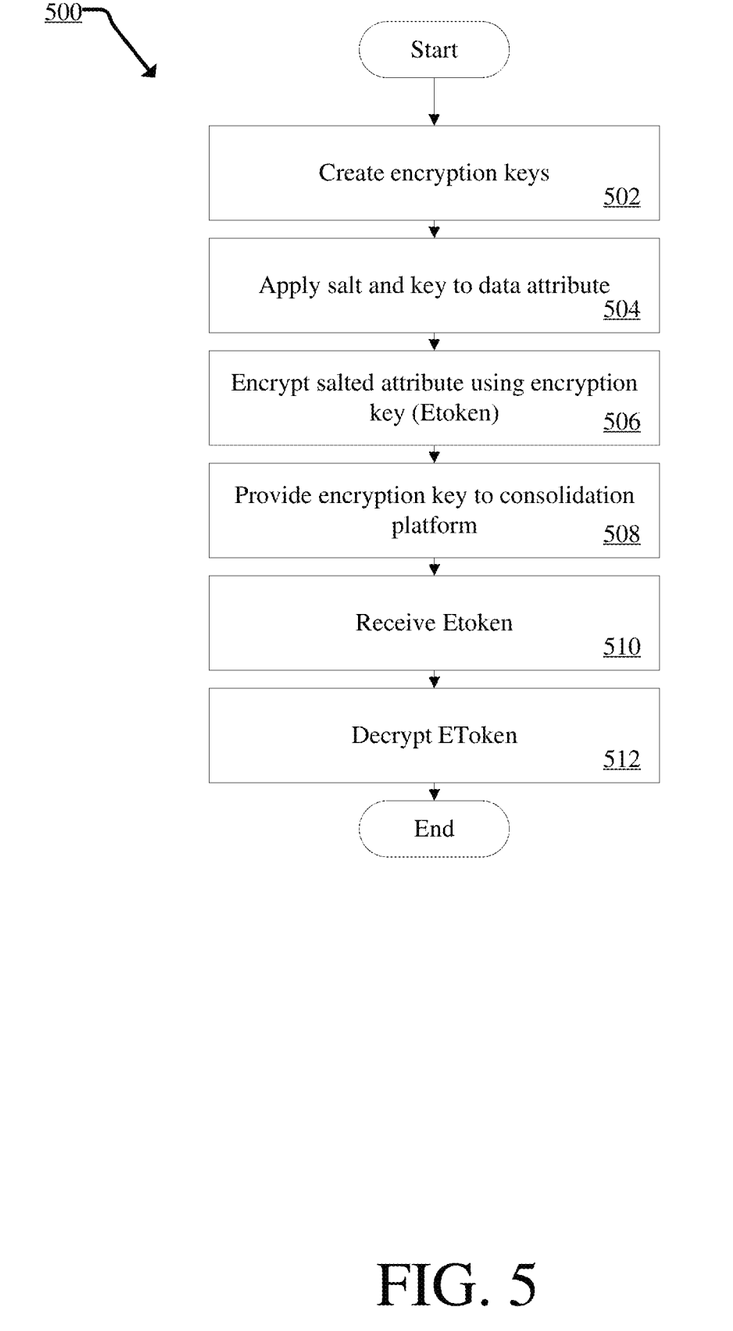
FIG. 5 illustrates an example method for administering an access key using a distributed ledger.

FIG. 5 illustrates an example method for administering a secret/key using a distributed ledger. Method 500 begins with the creation and management of a client's encryption key. In examples, a third-party key management system (KMS) may receive a request from a client to generate a key that may be applied to a particular token or data attribute that a client wishes to share with a third-party consolidation platform. The key may be created by the third-party KMS entity and stored on a private, permissioned blockchain. Further, a salt may be applied to the data attribute prior to encryption to add an additional layer of encryption to the data attribute. This application of salt to the data attribute may occur at step 504. The "salt" is random data appended to data that is used as additional input for a one-way hash function. The salt may be received from the distributed ledger node. These encryption keys received from the KMS entity (e.g., DLT dedicated Node (host server)) may also serve as pieces of random data to combine with a key or data attribute to further encrypt the token and/or data attribute. In some examples, the keys may comprise a token salt (AES 256) and an object ID encryption key (AES 256). The output of encryption a salted data attribute is an encrypted Token "EToken" (data attribute+salt+key=EToken). The EToken is what may be ultimately provided to the third-party consolidation platform.

At step 506, the client may apply the salt and at least one encryption key to a data attribute to create a EToken. A EToken is an hashed data attribute that is encrypted through the inputs of a salt and at least one encryption key. At step 508, the third-party consolidation platform may request the EToken decryption key from the third-party KMS entity. Based on previously-established rules (e.g., smart contracts), the third-party KMS may grant or deny access to the EToken decryption key for the third-party consolidation platform. For instance, a smart contract that is stored on the blockchain may indicate that the third-party consolidation platform has access to the EToken decryption key for only certain data attributes or for only a certain period of time. Otherwise, the EToken decryption key is not accessible by the third-party consolidation platform. In some instances, a client may have multiple EToken decryption keys corresponding to particular ETokens.

At step 510, the third-party consolidation platform may receive EToken(s) from the client. It is important to note that the third-party consolidation platform cannot decrypt the EToken without the EToken decryption key, which the third-party consolidation platform may receive from the third-party KMS entity. The client may also possess a copy of the client decryption key, but to decrease vulnerabilities, the third-party KMS management system may create and store the client decryption key, controlling access to the key. Further, the EToken decryption key merely decrypts the Etoken to reveal the token itself, not the underlying data. In other words, the third-party data consolidation platform is never exposed to the raw, underlying data that makes up the token. The third-party consolidation platform is equipped to process the token for, e.g., data matching, trusted source reference matching, etc.

At step 512, the Etoken may be decrypted by the third-party consolidation platform after it received the token decryption key from the KMS management system. Processing may be completed upon the decrypted token, and the results of the processing may be transmitted back to the edge node at the client (see FIG. 7).

Figure 6:
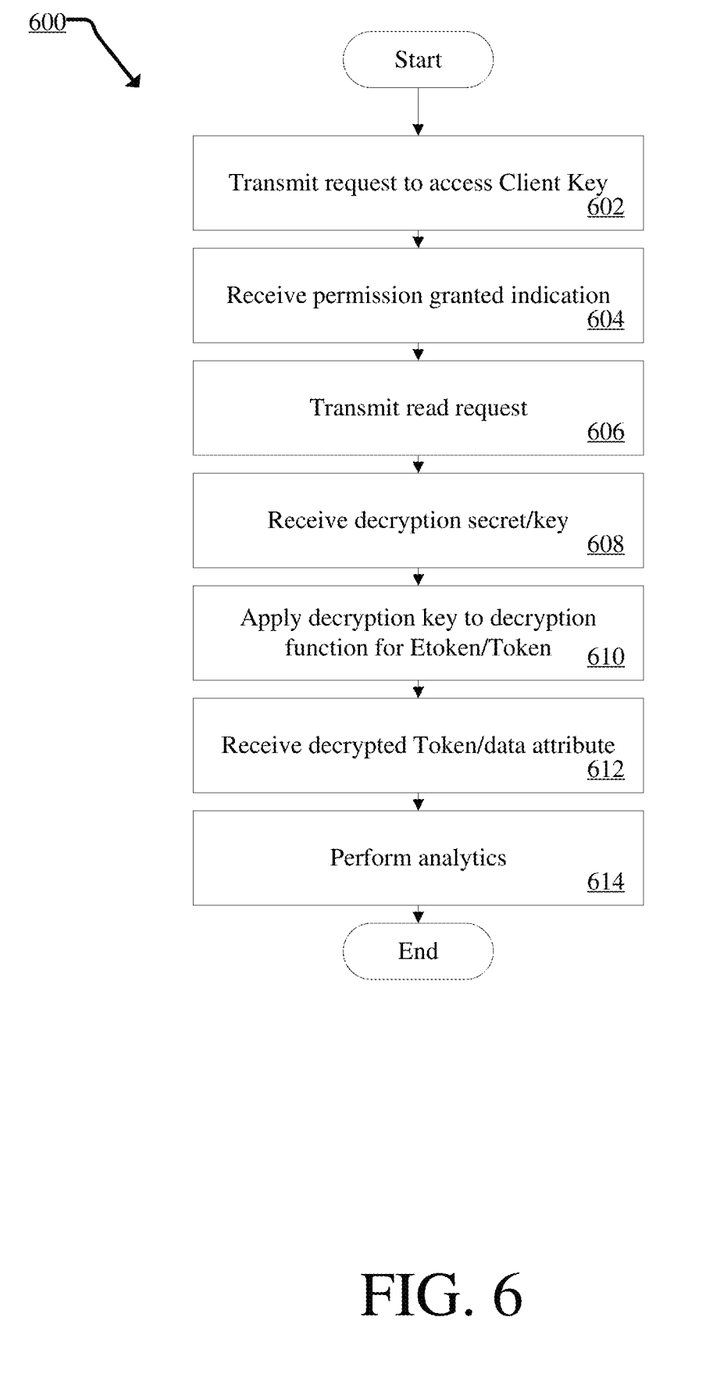
FIG. 6 illustrates an example method for administering an access key using a distributed ledger from the perspective of a requestor or an application of the requestor.

FIG. 6 illustrates an example method for administering the secret/key using a distributed ledger from the perspective of a requestor. Method 600 is from the perspective of the requestor interfacing with the third-party consolidation platform. Method 600 begins with transmitting a request to access a client key at step 602. This request is received and stored on the distributed ledger. If permission is granted, then the requestor will receive an indication that permission to access the client key has been granted at step 604. After access has been granted, a read request may be transmitted at step 606. The read request may indicate an intention to read a certain token/data attribute that is currently encrypted within a EToken/token. Since access to the client key has already been granted, the system automatically provides the decryption key to the requestor at step 608. Thus, rather than having to ping the client each time the requestor desires to access token/data provided by the client, the requestor can simply refer to the block in the blockchain (or other distributed ledger) that proves the requestor has permission to access the client key. This removes inefficiencies and delays in sharing data between the client and the requestor.

Once the decryption key is provided to requestor at 608, the decryption key may be used to decrypt the EToken/token that is harboring the token/data attribute. The decryption key may be used as an input to the encryption function for the token at step 610. After the EToken/token is decrypted, the decrypted token/data attribute may be available for access at step 612. The requestor may then perform data analytics (e.g., trusted source matching) at step 614.

Figure 7:
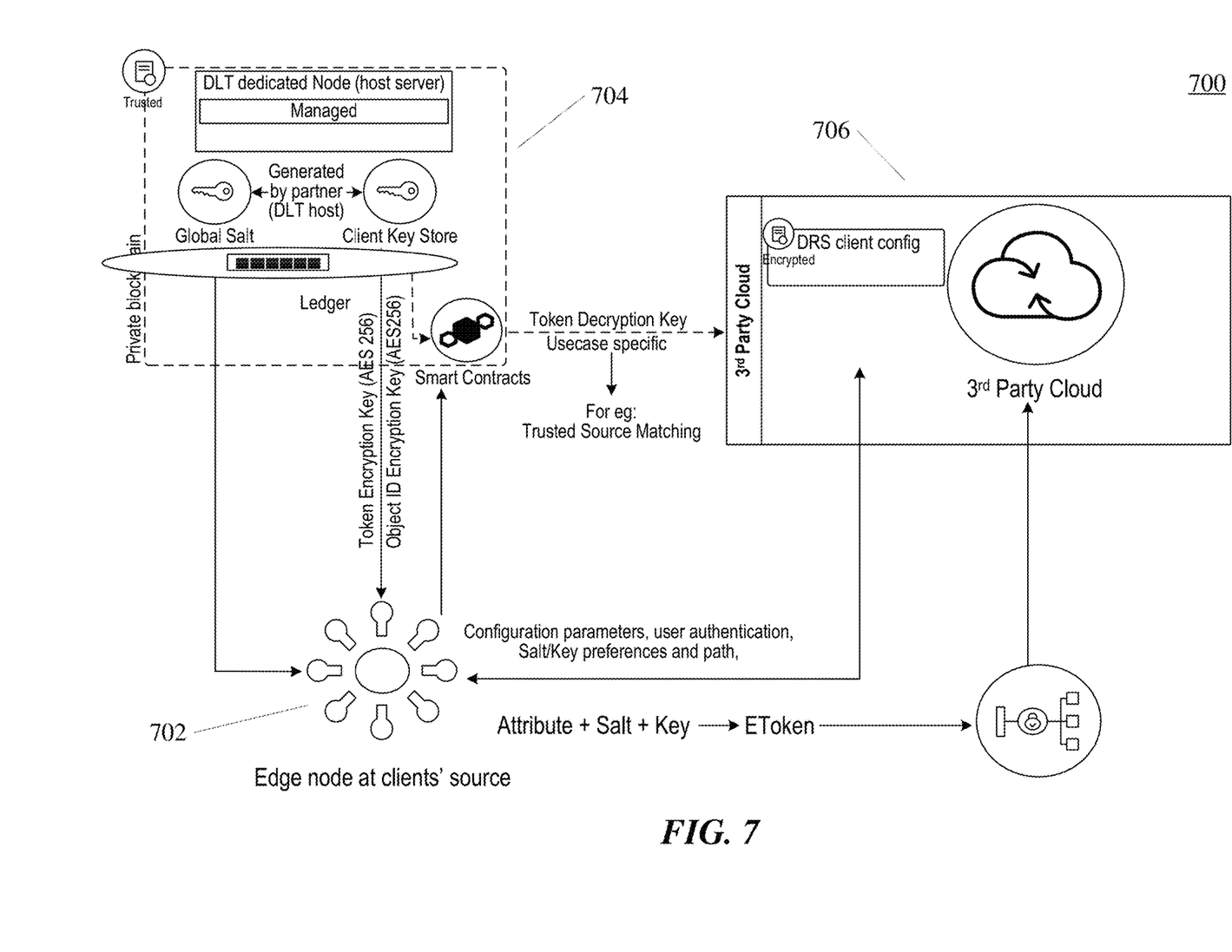
FIG. 7 illustrates an example environment for implementing systems and methods for administering an access key using a distributed ledger.

FIG. 7 illustrates an example environment for implementing systems and methods for administering a secret/key using a distributed ledger. Environment 700 depicts a client node 702, third-party KMS entity 704, and third-party consolidation platform 706. In examples, the client may request the creation of an encryption/decryption key (e.g., public/private key, secret key, etc.) from the KMS entity 704. The KMS entity may create an encryption key for the client and store the key on a distributed ledger, such as a blockchain. The ledger may be a permissioned ledger only accessible those to have permission. The encryption key may be used to further encrypt a client's token(s). The token(s) are data attributes that have already been hashed using configuration parameters provided to the client by the third-party consolidation platform. In other words, an encrypted token is a data attribute with at least two layers of encryption—(i) the data attribute is hashed to become a token by applying the tokenization parameters from the third-party consolidation platform, and (ii) the token is further encrypted by applying the encryption key from the third-party KMS platform. Such a dual, distributed encryption scheme preserves privacy and strengthens the security of the underlying data attribute.

In other examples, the third-party KMS system may also provide a salt in addition to the encryption key. For instance, the token—prior to being encrypted by the encryption key from the KMS system—may be "salted." This may mean, for example, that a random string of data (e.g., numbers, letters, bits, etc.) is appended to the token prior to being encrypted. The salting of the token provides for yet another layer of security to the underlying data attribute.

Both the salt and the token encryption key may be created, stored, and managed by the third-party KMS system. In other examples, the client may receive the salt and token encryption key to administer. Once the encryption key is created by the third-party KMS system, the encryption key may be provided to the client to apply to the token. The encryption key and the salt may be applied to the token to create an EToken that may ultimately be transmitted to the third-party consolidation platform for processing (e.g., data matching).

In one example, a client may possess a dataset of data attributes that the client wishes to match with other datasets it possesses. As such, the client solicits services from the third-party consolidation platform for data matching. The third-party consolidation platform may provide the client certain configuration parameters and tokenization software for the client to apply to its tokens so that the underlying data attributes are hashed/encrypted and hidden from the third-party consolidation platform's view. After the data attribute(s) are tokenized, the client may then elect to create an encryption key to apply to the token to further secure the underlying data. The encryption key may be created by the client using services of a third-party KMS system. The encryption mechanism applied to the token may consist of first applying a salt to the token and then encryption the salted token to create an "EToken." The EToken may then be transmitted to the third-party consolidation platform 706 for processing.

In order for the third-party consolidation platform 706 to process the EToken for certain use case/application, it must first decrypt the EToken so that it can access the underlying token (but not the underlying data attribute). Based on a previously-established smart contract between the client and the third-party consolidation platform, the third-party KMS system may provide the token decryption key to the third-party consolidation platform. This may be setup so that the smart contract exists on the permissioned ledger (e.g., blockchain) hosted by the third-party KMS system 704. Thus, when the third-party consolidation platform 706 request the token decryption key from the third-party KMS system 704, the third-party KMS system 704 can simply check the rules of the hosted smart contract to see if the request satisfies the requirements of the smart contract. For example, the smart contract may have certain requirements and inputs that the third-party consolidation platform may need to satisfy before the token decryption key may be transmitted, such as a timeframe for access, type of tokens that may be decrypted, etc. If the smart contract rules are satisfied (e.g., client 702 has given third-party consolidation platform 706 permission to decrypt a particular EToken), then the token decryption key may be shared with the third-party consolidation platform 706 from the third-party KMS system 704. Once received by the consolidation platform 706, the token decryption key may be applied to the Etoken to reveal the underlying token. The consolidation platform may then proceed to run processing actions on the token, such as trusted source data matching.

Figure 8:
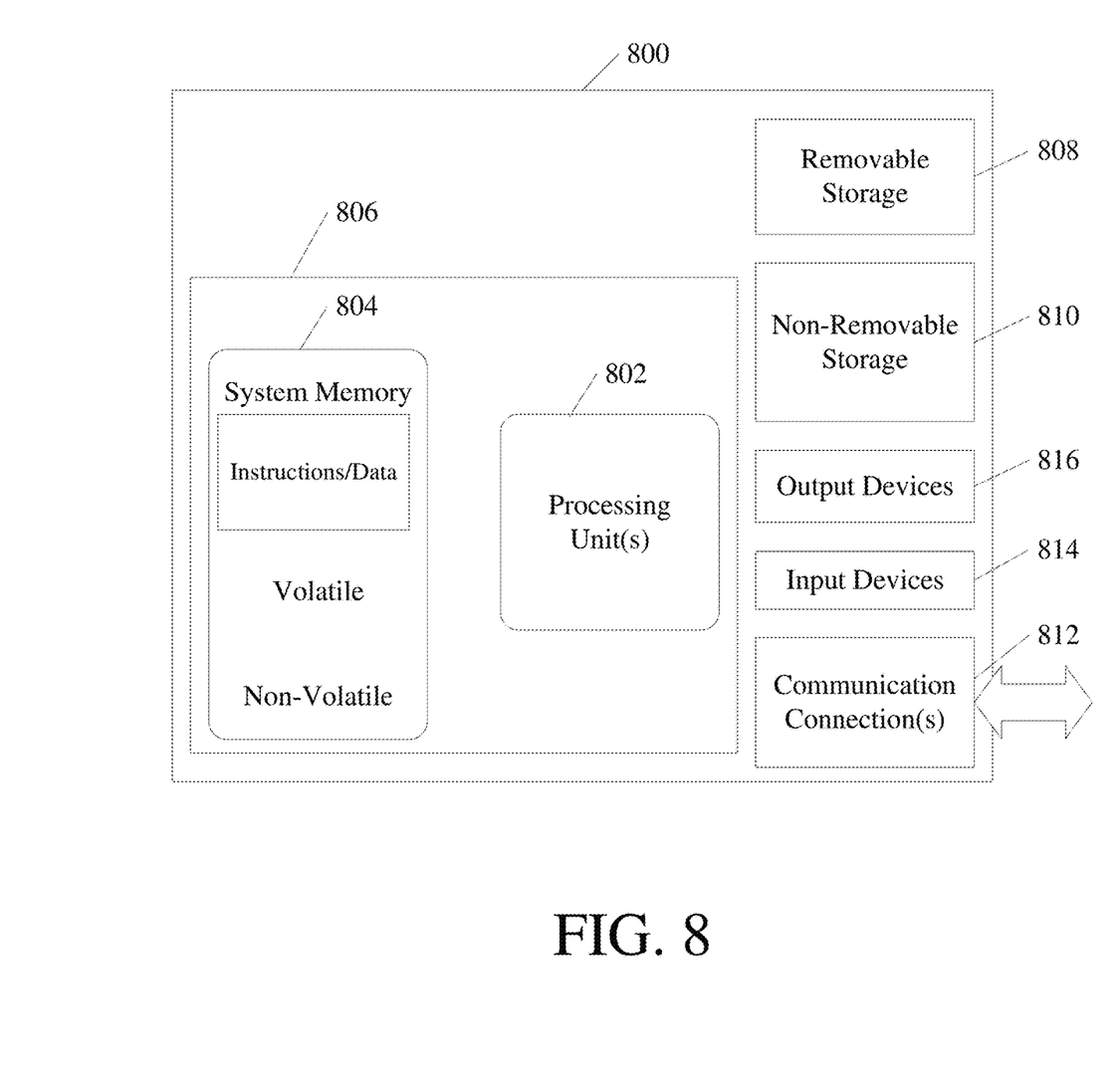
FIG. 8 illustrates one example of a suitable operating environment in which one or more of the present embodiments may be implemented.

FIG. 8 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to devices, blockchain networks, encryption algorithms, public keys, salts, and instructions to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable 808 and/or non-removable 810) including, but not limited to, magnetic or optical disks or tape. Similarly, environment 800 may also have input device(s) 814 such as keyboard, mouse, pen, voice input, etc., and/or output device(s) 816 such as a display, speakers, printer, etc. Also included in the environment may be one or more communication connections, 812, such as Bluetooth, WiFi, WiMax, LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures (e.g., blockchains), program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 800 may be a single computer (e.g., mobile computer) operating in a networked environment using logical connections to one or more remote computers. The remote computer may be a personal computer, a server, a router, a network PC, a peer device, a distributed ledger node, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A system comprising:
   at least one processor; and
   memory coupled to the at least one processor, the memory comprising computer executable instructions that, when executed by the at least one processor, performs a method comprising:
   receiving at least one encrypted token, wherein the at least one encrypted token comprises at least one encrypted data attribute, at least one encrypted token salt, and at least one encrypted object ID encryption key;
   requesting at least one decryption key associated with the at least one encrypted token, wherein the at least one decryption key is configured to decrypt the at least one encrypted token salt and the at least one encrypted object ID encryption key;
   analyzing at least one smart contract on a blockchain, wherein the at least one smart contract governs access to the at least one decryption key;
   based on the analysis of the at least one smart contract on the blockchain, determining that access to the at least one decryption key is granted;
   receiving the at least one decryption key;
   applying the at least one decryption key to the at least one encrypted token;
   receiving at least one decrypted token;
   processing the at least one decrypted token, wherein processing the at least one decrypted token comprises comparing trusted source data to the at least one decrypted token to identify one or more missing data attributes; and
   transmitting results from the processing of the at least one decrypted token to at least one owner of the at least one encrypted token.

2. The system of claim 1, wherein the at least one encrypted token is encrypted with at least one salt and at least one 256-bit encryption algorithm.

3. The system of claim 1, wherein the at least one decryption key is stored on at least one permissioned blockchain.

4. The system of claim 1, further comprising receiving at least one revocation notification, revoking access to the at least one decryption key.

5. The system of claim 1, wherein access to the at least one decryption key is temporal.

6. The system of claim 1, wherein access to the at least one decryption key is based on a classification of the at least one encrypted token.

7. A method for securely managing access to a key using distributed ledger technology, comprising:
- receiving a request to create at least one encrypted token, wherein the at least one encrypted token comprises at least one encrypted data attribute, at least one encrypted token salt, and at least one encrypted object ID encryption key;
- generating a decryption key associated with the at least one encrypted token, wherein the decryption key is configured to decrypt the at least one encrypted token salt and the at least one encrypted object ID encryption key;
- generating a smart contract that governs access to the decryption key;
- storing the decryption key and the smart contract governing access to the decryption key on a permissioned blockchain;
- requesting the decryption key associated with the at least one encrypted token;
- based on the smart contract, receiving the at least one decryption key;
- applying the at least one decryption key to the at least one encrypted token;
- receiving at least one decrypted token; and
- processing the at least one decrypted token, wherein processing the at least one decrypted token comprises comparing trusted source data to the at least one decrypted token to identify one or more missing data attributes.

8. The method of claim 7, wherein the at least one encrypted token is encrypted using at least one AES 256-bit encryption algorithm.

9. The method of claim 7, further comprising receiving at least one request to access the decryption key.

10. The method of claim 9, further comprising querying the smart contract on the permissioned blockchain to analyze at least one rule governing access to the decryption key.

11. The method of claim 10, based on the analysis of the at least one rule governing access to the decryption key, granting access to the decryption key.

12. The method of claim 11, further comprising recording the access grant to the decryption key on the permissioned blockchain.

13. The method of claim 10, based on the analysis of the at least one rule governing access to the decryption key, denying access to the decryption key.

14. The method of claim 13, further comprising recording the access denial to the decryption key on the permissioned blockchain.

15. The method of claim 9, wherein the at least one request to access the decryption key is stored on the permissioned blockchain.

16. A computer-readable media storing non-transitory computer executable instructions that when executed cause a computing system to perform a method for securely managing a key in a DLT environment comprising:
- receiving a request to create at least one encrypted token, wherein the at least one encrypted token comprises at least one encrypted data attribute, at least one encrypted token salt, and at least one encrypted object ID encryption key;
- generating a decryption key associated with the at least one encrypted token;
- generating a smart contract, wherein the smart contract comprises at least one rule that governs access to the decryption key;
- storing the smart contract, the decryption key on a permissioned blockchain;
- receiving at least one request to access the decryption key;
- determining whether to grant access to the decryption key based on the at least one rule governing access to the decryption key;
- based on the determination, granting access to the decryption key;
- applying the decryption key to the at least one encrypted token;
- receiving at least one decrypted token; and
- processing the at least one decrypted token, wherein processing the at least one decrypted token comprises comparing trusted source data to the at least one decrypted token to identify one or more missing data attributes.

* * * * *